United States Patent
Galarraga (10) Patent No.: US 9,654,740 B2
(45) Date of Patent: May 16, 2017

(54) CONTROLLING AUTOMOTIVE REAR-VIEW MIRROR BASED ON EYE MOVEMENT

(71) Applicant: International Business Machines Corporation, Armonk, NY (US)

(72) Inventor: Federico A. Galarraga, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 655 days.

(21) Appl. No.: 13/903,845

(22) Filed: May 28, 2013

(65) Prior Publication Data

US 2014/0354798 A1 Dec. 4, 2014

(51) Int. Cl.
*H04N 7/18* (2006.01)
*B60R 1/00* (2006.01)
*B60R 1/12* (2006.01)

(52) U.S. Cl.
CPC ............ *H04N 7/183* (2013.01); *B60R 1/00* (2013.01); *B60R 1/12* (2013.01); *B60R 2001/1253* (2013.01); *B60R 2300/602* (2013.01)

(58) Field of Classification Search
CPC .......... H04N 7/18; G06F 15/16; G01S 11/12; G06K 9/00791; B63B 45/02; B63B 49/00; G01C 21/00
See application file for complete search history.

(56) References Cited

U.S. PATENT DOCUMENTS

| | | | |
|---|---|---|---|
| 6,397,137 B1 | 5/2002 | Alpert et al. | |
| 6,954,152 B1 | 10/2005 | Matthews | |
| 7,463,166 B2 | 12/2008 | Segura Gordillo et al. | |
| 7,466,338 B2 | 12/2008 | Xie | |
| 7,571,041 B2 | 8/2009 | Lee et al. | |
| 8,004,425 B2 | 8/2011 | Hoek et al. | |
| 8,035,575 B2 | 10/2011 | Okabe et al. | |
| 8,144,033 B2 | 3/2012 | Chinomi et al. | |
| 2005/0128061 A1* | 6/2005 | Yanai | B60R 1/00 340/435 |
| 2005/0202844 A1* | 9/2005 | Jabri | A61B 5/7475 455/556.1 |

(Continued)

FOREIGN PATENT DOCUMENTS

CN 202098352 U 1/2012
CN 102358245 A 2/2012

(Continued)

OTHER PUBLICATIONS

"FaceLAB5, Eyetracking for Research," Seeing Machines, 2009, 4 pages.
"OptiTrack—V100:R2—Technical specifications for the V11:R2," Naturalpoint.com, publication date unknown, downloaded Feb. 7, 2013, 7 pages.
"Motorized Precision Rotation Mount," ThorLabs, 1999-2013, 2 pages.

(Continued)

*Primary Examiner* — Behrooz Senfi
*Assistant Examiner* — Maryam Nasri
(74) *Attorney, Agent, or Firm* — VanLeeuwen & VanLeeuwen; Richard A. Wilhelm (57) ABSTRACT

An approach is provided in which a rear view system provides a rear view video feed to a vehicle operator. The rear view system determines that an eye focus point of a vehicle operator is positioned in a camera angle change region for a predetermined amount of time and performs adjustments based upon the vehicle operator's eye focus point accordingly.

14 Claims, 7 Drawing Sheets

(56) References Cited

U.S. PATENT DOCUMENTS

| | | | |
|---|---|---|---|
| 2010/0049393 A1* | 2/2010 | Emam | G06N 5/02 |
| | | | 701/31.4 |
| 2010/0201816 A1* | 8/2010 | Lee | B60R 1/12 |
| | | | 348/148 |
| 2011/0010041 A1 | 1/2011 | Wagner et al. | |
| 2011/0161160 A1 | 6/2011 | Carlson et al. | |
| 2012/0147133 A1 | 6/2012 | Hadwiger et al. | |
| 2012/0271484 A1 | 10/2012 | Feit et al. | |
| 2013/0128047 A1* | 5/2013 | Lee | B60R 1/00 |
| | | | 348/148 |

FOREIGN PATENT DOCUMENTS

| | | |
|---|---|---|
| EP | 2168815 A1 | 3/2010 |
| JP | 2005066023 A | 3/2005 |
| WO | WO2011017790 A1 | 2/2011 |

OTHER PUBLICATIONS

Holstein et al., "Five Annoying Safety Technologies," Car and Driver, Apr. 2007, 3 pages.

"RED/RED250/RED500," SensoMotoric Instruments, publication date unknown, downloaded Feb. 7, 2013, 2 pages.

"Tobii X1 Light Eye Tracker, Snap-on eye tracking system for your portable lab," Tobii, Jan. 2012, 6 pages.

"LS460 achieves a world-first in preventative safety," Newcarnet.co, Aug. 30, 2006, 1 page.

"2013 Infiniti JX Quick Reference Guide," Infiniti, Jan. 2012, 36 pages.

"Take the stress out of your commute," LaneFX, 2006-2009, 3 pages.

* cited by examiner

CONTROLLING AUTOMOTIVE REAR-VIEW MIRROR BASED ON EYE MOVEMENT

BACKGROUND

The present disclosure relates to adjusting a vehicle's rear view camera, based upon the vehicle operator's eye movement, to reduce blind spot areas in proximity to the vehicle.

Vehicles, such as automobiles, trucks, vans, recreational vehicles, etc., typically include a rear view mirror and side view mirrors. The rear view mirror is attached on or in proximity to the vehicle's front windshield, and the side view mirrors are attached on or in proximity to the vehicle's front doors. A vehicle operator utilizes the rear view mirror and side view mirrors to remain aware of nearby obstacles and other vehicles, such as when the vehicle operator wishes to change lanes while driving on a multi-lane highway.

The rear view mirror and side view mirrors display various areas surrounding the rear portion of a vehicle. However, a rear viewing area displayed by the rear view mirror and side viewing areas displayed by the side view mirrors do not overlap, thus creating "blind spots" for the vehicle operator.

BRIEF SUMMARY

An approach is provided in which a rear view system provides a rear view video feed to a vehicle operator. The rear view system determines that an eye focus point of a vehicle operator is positioned in a camera angle change region for a predetermined amount of time and performs adjustments based upon the vehicle operator's eye focus point accordingly.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer, server, or cluster of servers. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
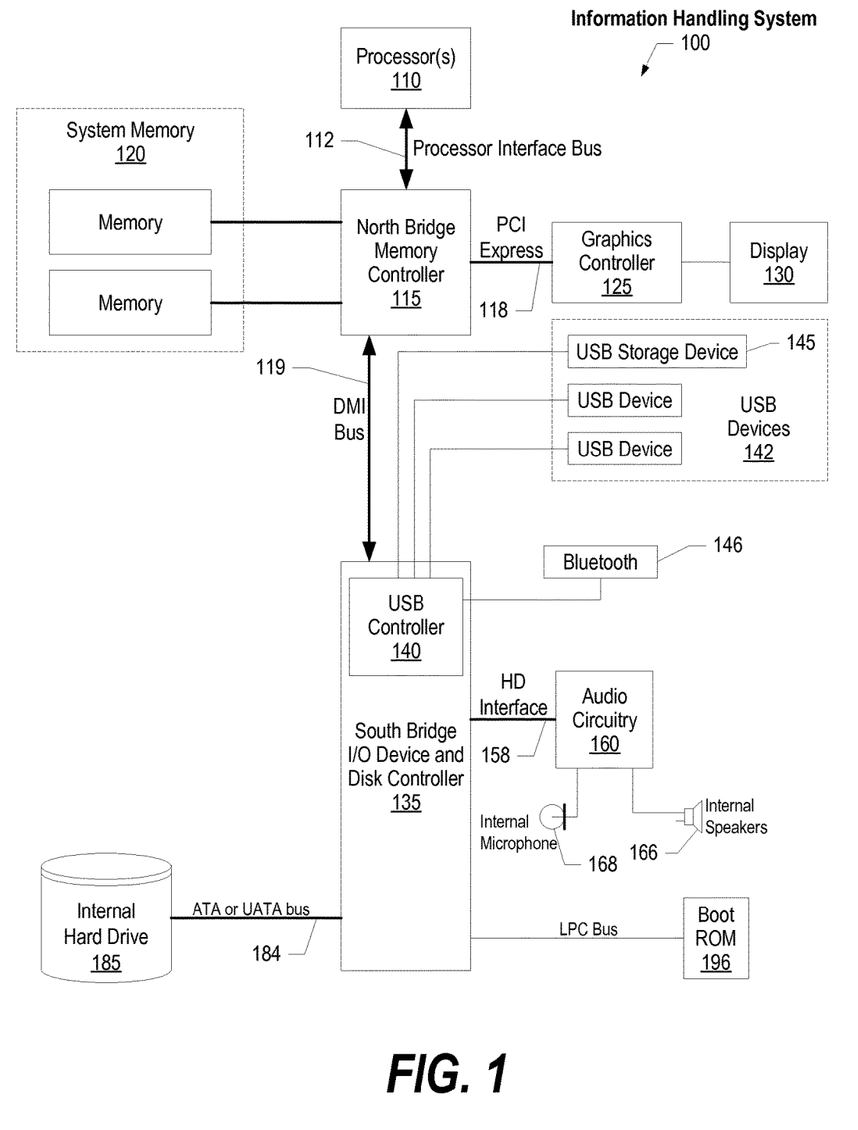
FIG. 1 is a block diagram of a data processing system in which the methods described herein can be implemented.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a display screen.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

Southbridge 135 includes USB Controller 140 that provides USB connectivity to devices that connect to the USB. These devices include and Bluetooth device 146, which provides for wireless personal area networks (PANs). USB Controller 140 also provides USB connectivity to other miscellaneous USB connected devices 142, such as a removable nonvolatile storage device 145, and many other types of USB connected devices. While removable nonvolatile storage device 145 is shown as a USB-connected device, removable nonvolatile storage device 145 could be connected using a different interface, such as a Firewire interface, etcetera.

Audio circuitry 160, such as a sound card, connects to Southbridge 135 via bus 158. Audio circuitry 160 also provides functionality such as internal speakers 166 and internal microphone 168.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, a portable telephone device, a communication device or other devices that include a processor and memory.

FIGS. 2-10 depict an approach that can be executed on an information handling system, such as one shown in FIG. 1. A system and method to adjust a rear view system according to a vehicle operator's eye focus point is provided, which reduces the vehicle operator's "blind spots" in proximity to the vehicle. The rear view system includes a rear view display, such as a liquid crystal display (LCD), an eye tracking device, an adjustable rear view camera, and a rear view system manager (e.g., a processing device, memory, etc.). The rear view system displays a video feed, provided by the adjustable rear view camera, on the rear view display. For example, the rear view system, upon start up, adjusts the rear view camera to a default position, such as a zero axis position facing directly behind the vehicle, and displays a center rear viewing area on the rear view display. As the vehicle operator drives the vehicle, the rear view system monitors the vehicle operator's eye movements via the eye tracking device. When the vehicle operator looks at predefined "camera angle change regions" on the rear view display, the rear view system adjusts the rear view camera to a different camera angle (left or right) and provides a rear view video feed from the different camera angle to the vehicle operator.

In one embodiment, the camera angle change regions are located on the far left or far right areas of the rear view display. For example, when the vehicle operator wishes to change lanes on a road, the vehicle operator looks at the left side of the rear view display and the rear view system adjusts the rear view camera angle to a "left" camera position, which provides a video feed of the rear driver's side of the vehicle. In another embodiment, the rear view system illuminates a camera angle indicator on the rear view display that indicates which rear view camera angle is providing the currently displayed video feed (e.g., left camera angle, center camera angle, right camera angle).

In another embodiment, instead of adjusting a single camera to different camera positions, the rear view system includes multiple cameras. In this embodiment, the rear view system selects one of the cameras according to the vehicle operator's eye movements and displays the selected camera's video feed on the rear view display. In yet another embodiment, the rear view system also adjusts the position of a vehicle's side mirrors in addition to adjusting the rear view camera.

Figure 2:
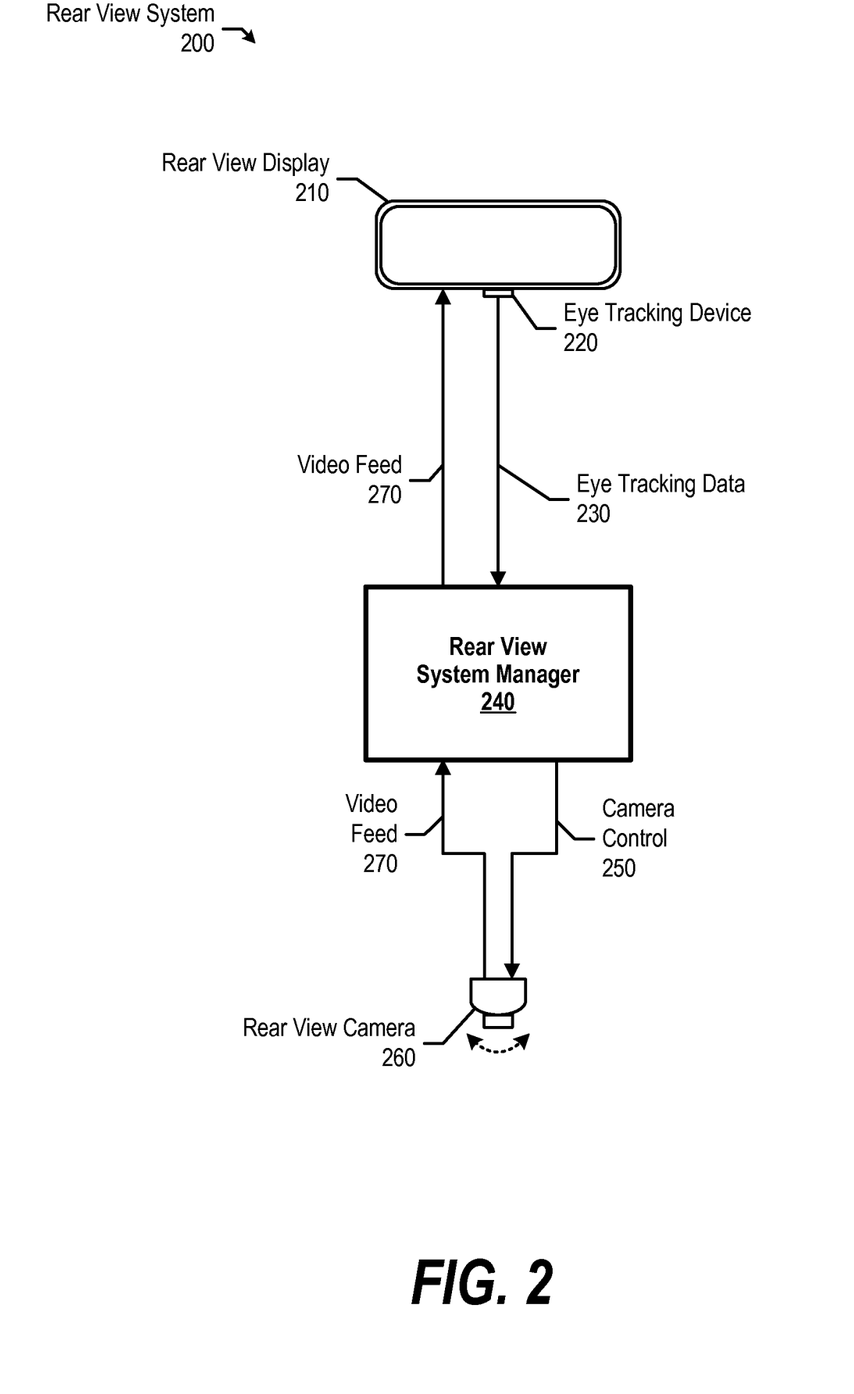
FIG. 2 is a depiction of a diagram showing various components of a rear view system.

FIG. 2 is a depiction of a diagram showing various components of a rear view system. Rear view system 200 includes rear view display 210 (e.g., liquid crystal display (LCD)), eye tracking device 220, rear view system manager 240, and adjustable rear view camera 260. In one embodiment, rear view display 210 is installed inside a vehicle's cabin compartment, such as affixed to the inside of the front windshield, and eye tracking device 220 is mounted on rear view display 210. Rear view system manager 240 includes a processing device encased in a housing that may be located, for example, in the vehicle's trunk, under a seat, under the vehicle's front dash, or other inconspicuous area. Rear view camera 260 is installed external to the vehicle, such as in proximity to the vehicle's rear license plate. In one embodiment, rear view camera 260 is a special type of video camera that is produced specifically for the purpose of being attached to the rear of a vehicle. In this embodiment, the image from rear view camera 260 is horizontally flipped so that the output is a mirror image (or with the aid from rear view system manager 240) since the camera and the vehicle operator face opposite directions.

When a vehicle operator starts the vehicle, rear view system manager 240 positions rear view camera 260 in a default position via camera control 250. The default camera position may be a central position that faces directly behind the vehicle. In one embodiment, the vehicle operator can adjust the default position, such as a two degree left/right offset from the central position. In turn, rear view camera 260 provides video feed 270 to rear view system manager 240, which rear view system manager 240 provides to rear view display 240. In one embodiment, rear view system manager 240 overlays camera angle indicators onto video feed 270 that indicate which camera angle corresponds to video feed 270 (e.g., left, center, right, see FIGS. 3, 6A-6C, and corresponding text for further details).

Eye tracking device 220 monitors the vehicle operator's eye movement and provides eye tracking data 230 to rear view system manager 240. Rear view system manager 240 waits for the vehicle operator's eye focus point (e.g., location at which the vehicle operator looks) to enter a camera angle change region on rear view display 210, such as on the far left or far right areas of rear view display 210 (see FIG. 3 and corresponding text for further details). When the vehicle operator's eye focus point falls within one of the camera angle change regions, rear view system manager 240 adjusts rear view camera 260 vial camera control 250 to a different rear view camera angle. For example, if the vehicle operator's eye focus point lands within a left camera angle change region (e.g., the left side of rear view display 210), rear view system manager 240 adjusts rear view camera 260 to a left rear view camera angle (see FIGS. 5, 6B, and corresponding text for further details). In turn, rear view camera 260 provides a video feed of the left rear side of the vehicle, thus minimizing the vehicle operator's blind spot.

In one embodiment, instead of or in addition to moving rear view camera 260, rear view camera 260 (or rear view system manager 240) selects a different portion of a larger image to display, such as by selecting a different portion of a CCD (charge-coupled device) included in rear view camera 260 to be the source of video feed 270.

In addition, rear view system manager 240 illuminates a camera angle indicator on rear view display 210 that corresponds to the new rear view camera angle (e.g., "left camera angle"). In one embodiment, rear view system manager 240 provides the adjusted (non-default) rear view camera video feed for a predefined amount of time (e.g., 10 seconds) before reverting back to a default camera position. In another embodiment, rear view system manager 240 detects the vehicle performing a lane change and adjusts rear view camera 260 to the default camera angle after completing the lane change (e.g., turn signal turns off). In yet another embodiment, rear view system manager 240 detects that the vehicle operator's eye focus point enters a different camera angle change region, in which case rear view system manager 240 adjusts rear view camera 260's camera angle accordingly.

Figure 3:
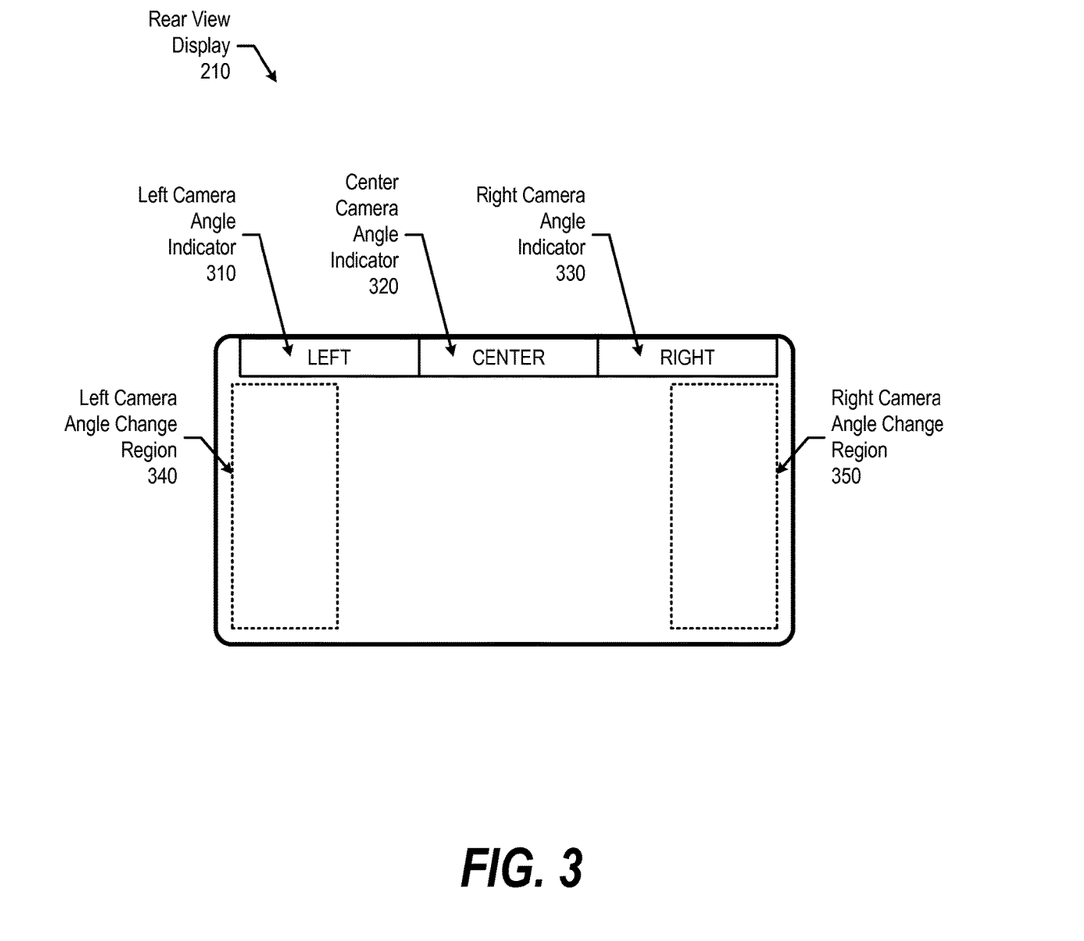
FIG. 3 is a depiction of a diagram showing a rear view display that includes camera angle indicators and camera angle change regions.

FIG. 3 is a depiction of a diagram showing a rear view display that includes camera angle indicators and camera angle change regions. Rear view display 210 displays video feed 270 (shown in FIG. 2) to a vehicle operator. In one embodiment, rear view display 210 includes camera angle indicators 310, 320, and 330, which indicate the camera angle of rear view camera 260 corresponding to the currently displayed video feed. For example, when the rear view camera is in the center position, center camera angle indicator 320 is illuminated.

FIG. 3 also depicts camera angle change regions 340 and 350 on rear view display 210. In one embodiment, camera angle change regions 340 and 350 are outlined on rear view display 210 as shown in FIG. 3. In another embodiment, rear view display 210 does not display visible indications of camera angle change regions 340 and 350. When a vehicle operator's eye focus point falls within one of camera angle change regions 340 or 350, rear view system manager 240 adjusts the camera angle on rear view camera 260 accordingly. In one embodiment, camera angle change regions 340 and 350 may be configurable, such as the size of their width and/or location, as well as the amount of time required by the vehicle operator to focus on the camera angle change region (e.g., .5 seconds, 1 second, 2 seconds, etc.). For example, the vehicle operator may configure camera angle change regions 340 and 350 such that rear view system manager 240 changes camera angles when the vehicle operator looks to the lower left corner or lower right corner of rear view display 210 for two seconds.

Rear view display 210 also displays camera angle indicators 310, 320, and 330. These indicators provide the vehicle operator with an indication as to the camera angle of the rear view camera (see FIGS. 6A-6C and corresponding text for further details). In one embodiment, camera angle indicators 310, 320, and 330 may also be configured to be camera angle change regions. In this embodiment, the vehicle operator may look at left camera angle indicator 310 to instruct rear view system manager 240 to adjust rear view camera 260 to a left camera angle. To instruct rear view system manager 240 to revert back to the default camera angle, the vehicle operator may look at center camera angle indicator 320, which instructs rear view system manager 240 to move rear view camera 260 to a center rear camera angle.

Figure 4A:
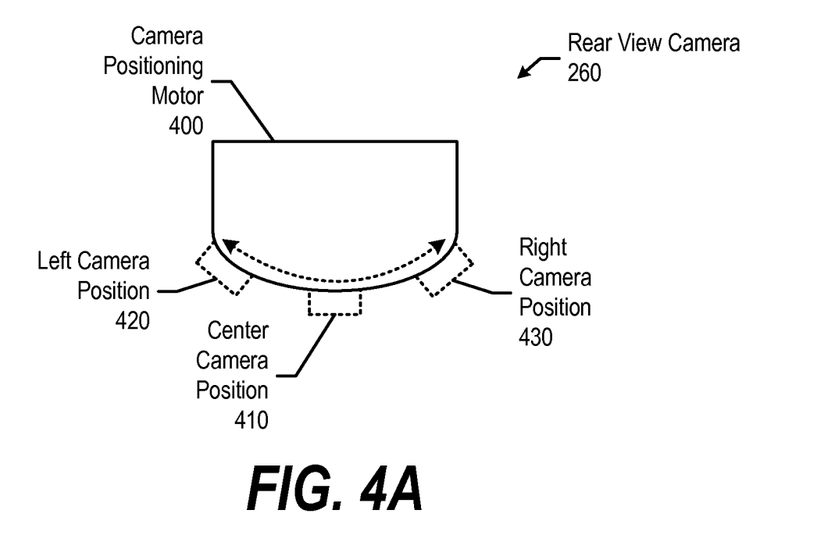
FIG. 4A is a depiction of a diagram showing a rear view camera having one camera lens that is adjusted to different camera angles based upon the vehicle operator's eye focus point.

FIG. 4A is a depiction of a diagram showing a rear view camera having one camera lens that is adjusted to different camera angles based upon the vehicle operator's eye focus point. Rear view camera 260 includes camera positioning motor 400, which adjusts the camera lens to center camera position 410, left camera position 420, or right camera position 430 based upon camera control 250 received from rear view system manager 240 (shown in FIG. 2). In one embodiment, center camera position 410 points directly behind the vehicle (zero degree axis); left camera position 420 is at a 15-20 degree offset position to the left of center camera position 410; and right camera position is at a 15-20 degree offset position to the right of center camera position 410. In another embodiment, the vehicle operator may customize the offsets of the three different camera positions.

Figure 4B:
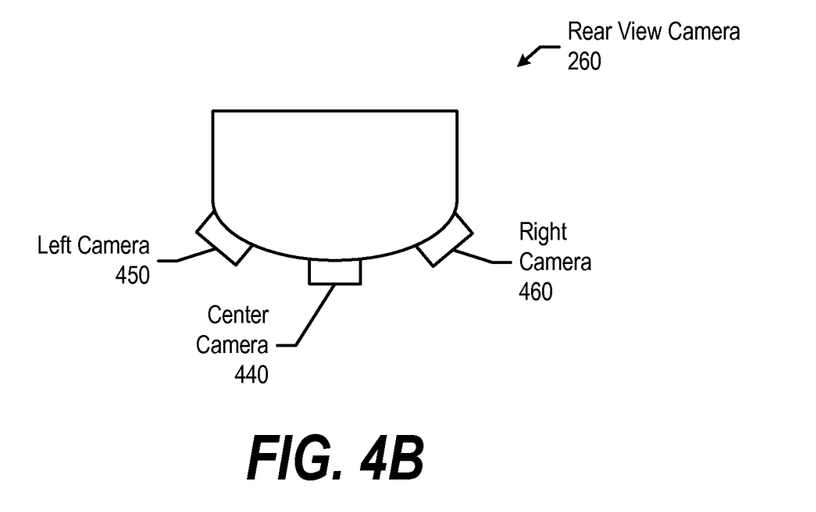
FIG. 4B is a depiction of a diagram showing a rear view camera system that includes multiple cameras positioned at different camera angles.

FIG. 4B is a depiction of a diagram showing a rear view camera system that includes multiple cameras positioned at different camera angles. In one embodiment, instead of adjusting a single camera to different camera positions as shown in FIG. 4A, rear view camera 260 may include three separate cameras 440, 450, and 460 (shown in FIG. 4B). In this embodiment, each camera provides a video feed to rear view system manager 240. Rear view system manager 240, in turn, selects one of the three video feeds based upon the vehicle operator's eye focus point. For example, rear view system manager 240 may select a default video feed provided by center camera 440, and select a different video feed provided by left camera 450 when the vehicle operator's eye focus point falls within a left camera angle change region on rear view display 210.

Figure 5:
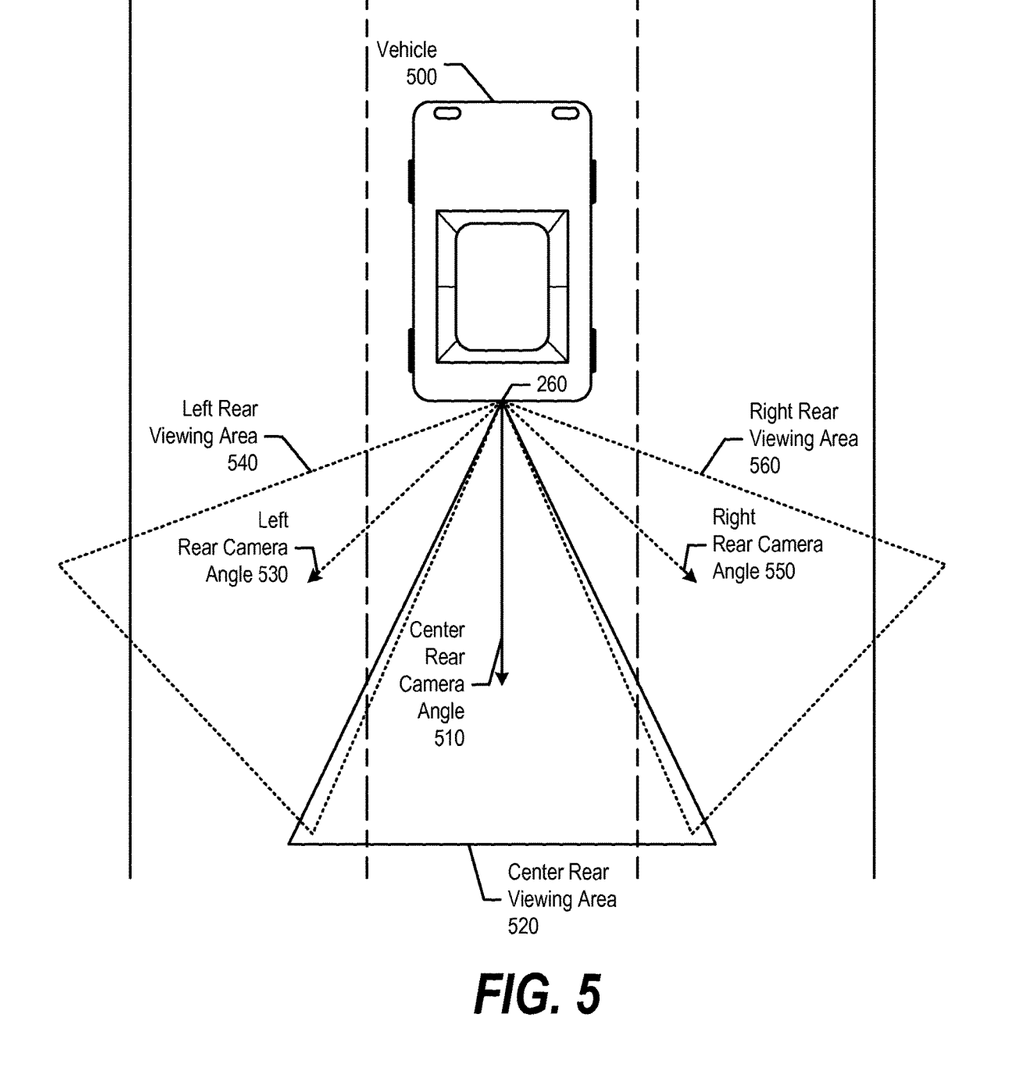
FIG. 5 is a depiction of a diagram showing different viewing areas provided to a vehicle operator by a rear view system.

FIG. 5 is a depiction of a diagram showing different viewing areas provided to a vehicle operator by a rear view system. Vehicle 500 includes rear view system 200, which includes rear view camera 260. Rear view camera 260 may include one adjustable rear camera (e.g., FIG. 4A) or multiple rear view cameras (e.g., FIG. 4B).

In one embodiment, rear view system manager 240 adjusts rear view camera 260 to one of three camera angles. A default camera angle, such as center rear camera angle 510, is positioned such that center rear viewing area 520 captures the rear viewing area of vehicle 500. Rear view system manager 240 adjusts rear view camera 260 to left rear camera angle 530 or right rear camera angle 550 according to the vehicle operator's eye focus position. As such, the vehicle operator can view left rear viewing area 540 or right rear viewing area 560, respectively, thus reducing blind spots in proximity to vehicle 500.

Figure 6A:
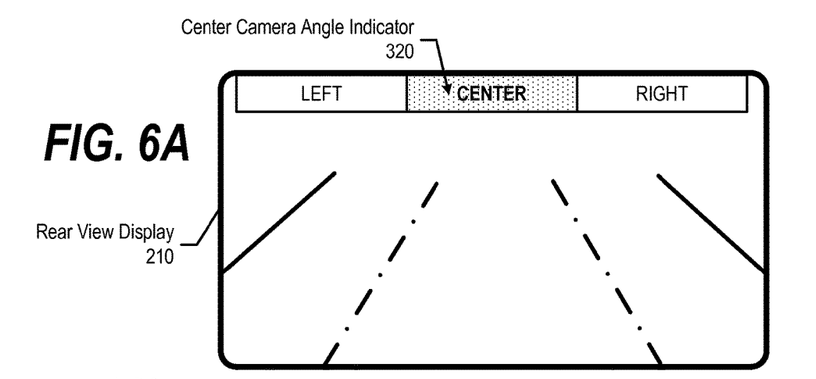
FIG. 6A is a depiction of a diagram showing a rear view display providing a center camera angle video feed.

FIG. 6A is a depiction of a diagram showing the rear view display providing a center camera angle video feed. Rear view system manager 240 positions rear view camera 260 in a center, default position, and provides a video feed to rear view display 210 that depicts a center viewing area (e.g., center rear viewing area 520 shown in FIG. 5). As such, rear view system manager 240 illuminates center camera angle indicator 320 to inform the vehicle operator that the viewing area displayed in rear view display 210 corresponds to the center rear area of the vehicle. In an embodiment that includes multiple rear view cameras such as that shown in FIG. 4B, rear view system manager 240 selects a video feed provided by center camera 440.

Figure 6B:
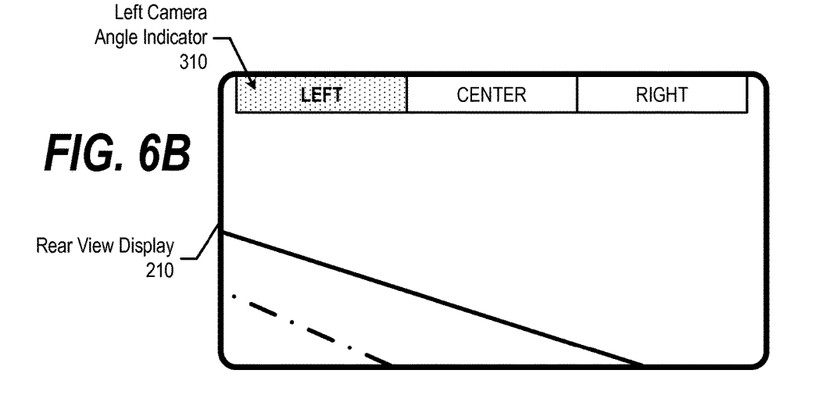
FIG. 6B is a depiction of a diagram showing the rear view display providing a left camera angle video feed.

FIG. 6B is a depiction of a diagram showing the rear view display providing a left camera angle video feed. Rear view system manager 240 detects that the vehicle operator's eye focus point falls within a left camera angle change region (e.g., left camera angle change region 340 shown in FIG. 3). As such, rear view system manager 240 positions rear view camera 260 in a left camera position, and provides a video feed to rear view display 210 that depicts a left rear viewing area (e.g., left rear viewing area 540 shown in FIG. 5). As such, rear view system manager 240 illuminates left camera angle indicator 310 to inform the vehicle operator that the viewing area displayed in rear view display 210 corresponds to the left rear area of the vehicle. In an embodiment that includes multiple rear view cameras such as that shown in FIG. 4B, rear view system manager 240 selects a video feed provided by left camera 450.

Figure 6C:
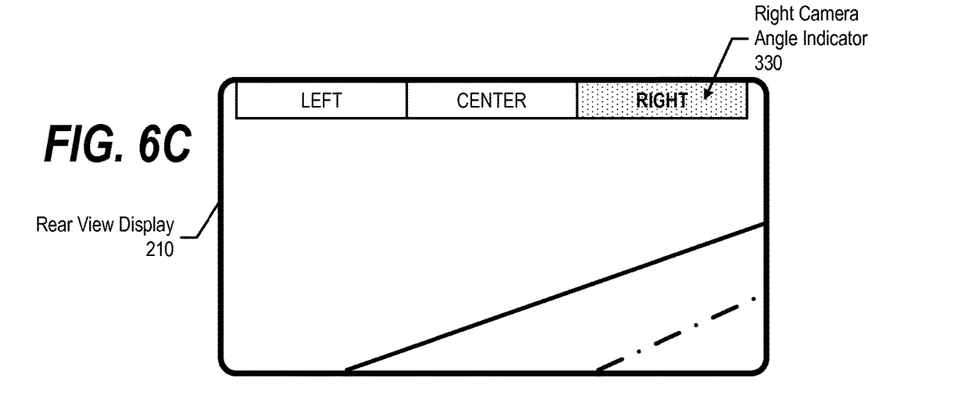
FIG. 6C is a depiction of a diagram showing the rear view display providing a right camera angle video feed.

FIG. 6C is a depiction of a diagram showing the rear view display providing a right camera angle video feed. Rear view system manager 240 detects that the vehicle operator's eye focus point falls within a right camera angle change region (e.g., right camera angle change region 350 shown in FIG. 3). As such, rear view system manager 240 positions rear view camera 260 in a right camera position, and provides a video feed to rear view display 210 that depicts a right rear viewing area (e.g., right rear viewing area 560 shown in FIG. 5). As such, rear view system manager 240 illuminates right camera angle indicator 330 to inform the vehicle operator that the viewing area displayed in rear view display 210 corresponds to the right rear area of the vehicle. In an embodiment that includes multiple rear view cameras such as that shown in FIG. 4B, rear view system manager 240 selects a video feed provided by right camera 460.

Figure 7:
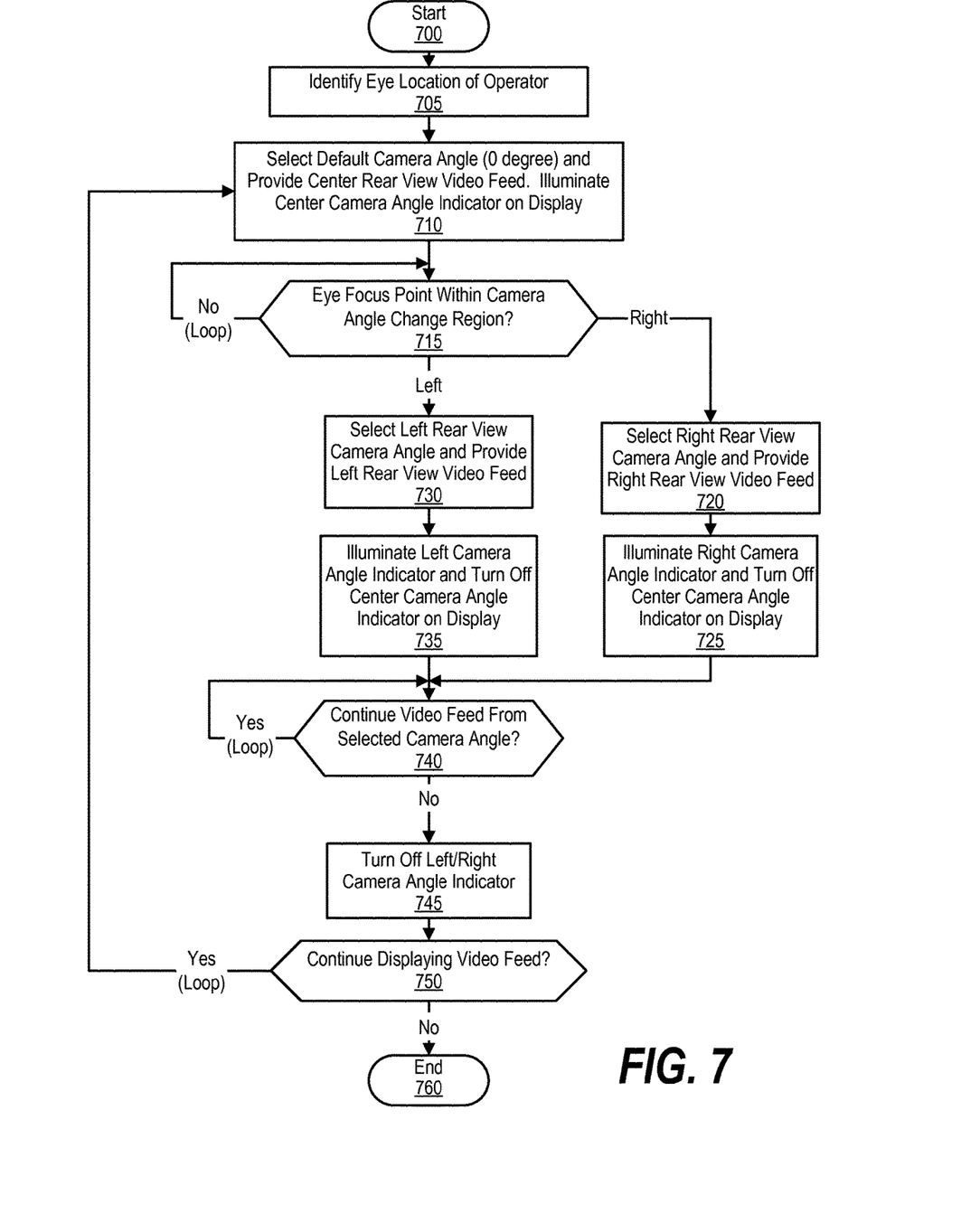
FIG. 7 is a depiction of a flowchart showing the logic used by a rear view system manager to adjust the rear view system according to the vehicle operator's eye focus point.

FIG. 7 is a depiction of a flowchart showing the logic used by rear view system manager 240 to adjust the rear view system according to the vehicle operator's eye focus point. Rear view system manager processing commences at 700, whereupon the rear view system manager identifies the vehicle operator's eye location using data received from eye tracking device 220 (step 705). In one embodiment, eye tracking device 220 and rear view system manager 240 identify the location of the vehicle operator's face and proceed to identify the vehicle operator's eye location using facial identification algorithms. In another embodiment, the vehicle operator's facial characteristics are stored to expedite step 705 (similar to saving the vehicle operator's seat adjustments).

At step 710, the rear view system manager instructs the rear view camera to move to a default, central camera position. The rear view camera provides a center rear viewing area video feed to the rear view system manager that, in turn, provides the video feed, along with camera angle indicator overlay information (e.g., illuminating the center camera angle indicator), to the rear view display.

The rear view system manager tracks the vehicle operator's eye focus point (eye movement), and determines whether the vehicle operator looks at a camera angle change region (e.g., regions 340 or 350 shown in FIG. 3) (decision 715). In one embodiment, the rear view system manager determines whether the vehicle operator looks at a camera angle change region for a predetermined amount of time (e.g., two seconds), which may be configurable by the vehicle operator. If the vehicle operator does not look at a camera angle change region, decision 715 branches to the "No" branch, which loops back and the rear view system continues to provide the center rear viewing area video feed and monitor the vehicle operator's eye movement.

When the vehicle operator looks at a right camera angle change region, decision 715 branches to the "Right" branch, whereupon the rear view system manager instructs the rear view camera to move to the right rear camera angle (step 720), which provides a video feed that depicts the right rear viewing area (right rear viewing area 560 shown in FIG. 5). In an embodiment that utilizes multiple rear view cameras such as that shown in FIG. 4B, the rear view system manager selects a video feed generated by right camera 460. At step 725, the rear view system manager illuminates the right camera angle indicator on the rear view display and turns off the center camera angle indicator.

Referring back to decision 715, when the vehicle operator looks at a left camera angle change region on the rear view display, decision 715 branches to the "Left" branch, whereupon the rear view system manager instructs the rear view camera to move to the left rear camera angle (step 730), which provides a video feed that depicts the left rear viewing area on the rear view display (left rear viewing area 540 shown in FIG. 5). In an embodiment that utilizes multiple rear view cameras such as that shown in FIG. 4B, the rear view system manager selects a video feed generated by left camera 450. In another embodiment, instead of or in addition to moving rear view camera 260, rear view camera 260 (or rear view system manager 240) selects a different portion an image to display by selecting a different portion of a CCD (charge-coupled device) included in rear view camera 260 to be the source of video feed 270.

At step 735, the rear view system manager illuminates the left camera angle indicator on the rear view display and turns off the center camera angle indicator.

The rear view system manager determines whether to continue providing the video feed from the left/right camera angle (decision 740). For example, the rear view system manager may provide the video feed from the selected angle for a preset time limit, such as 10 seconds. In another example, the rear view system manager may detect that the vehicle changes lanes and revert back to the default, center rear camera angle once the vehicle completes the lane change. In yet another embodiment, the vehicle operator may look at a center camera angle change region (e.g., center camera angle indicator 320) to instruct the rear view system manager to move the rear view camera to the center rear camera angle. The rear view system manager loops on decision 740's "Yes" branch until the rear view system manager should revert back to a default camera angle, at which point decision 740 branches to the "No" branch.

At step 745, the rear view system manager turns off the left or right camera angle indicators displayed on the rear view display, and the rear view system manager determines whether to continue displaying a video feed (e.g., until the vehicle is turned off). If the rear view system manager should continue to display a video feed, decision 750 branches to the "Yes" branch, which loops back and the rear view system manager positions the rear view camera at the center camera position and illuminate the center camera angle indicator. When the rear view system manager determines to terminate the video feed, decision 750 branches to the "No" branch and processing ends at 760.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

The invention claimed is:

1. A method of adjusting a rear view system, implemented by an information handling system, comprising:
  providing, by the rear view system, a rear view video feed from a rear view camera on a rear view display;
  determining that an eye focus point of a vehicle operator is positioned in a selected one of a plurality of regions located on the rear view display for at least a predetermined amount of time, wherein each of the plurality of regions corresponds to one of a plurality of subsections of the rear view display;
  adjusting the rear view camera based upon the eye focus point from a first rear camera angle to a second rear camera angle;
  determining a lane change of the vehicle subsequent to moving the rear view camera to the second rear camera angle; and
  automatically moving the rear view camera back to the first rear camera angle in response to the determining of the lane change.

2. The method of claim 1 wherein
  the first rear camera angle corresponds to a default camera angle and the second rear camera angle corresponds to the selected region.

3. The method of claim 2 further comprising:
  providing an indication to the vehicle operator on the rear view display that indicates the video feed corresponds to the second rear camera angle.

4. The method of claim 1 wherein the rear view video feed captures a live viewing area that is external to the vehicle.

5. The method of claim 1 wherein the rear view system includes a plurality of rear view cameras, and wherein the rear video feed is provided by a first one of the plurality of rear view cameras, the method further comprising:
  selecting a second one of the plurality of rear view cameras that correspond to the selected region; and
  providing a different rear view video feed to the vehicle operator that is generated by the selected second one of the plurality of rear view cameras.

6. An information handling system comprising: one or more processors;
a memory coupled to at least one of the processors;
a set of instructions stored in the memory and executed by at least one of the processors in order to perform actions of:
providing a rear view video feed from a rear view camera on a rear view display; determining that an eye focus point of a vehicle operator is positioned in a selected one of a plurality of regions located on the rear view display for at least a predetermined amount of time, wherein each of the plurality of regions corresponds to one of a plurality of subsections of the rear view display; and
adjusting the rear view camera based upon the eye focus point from a first rear camera angle to a second rear camera angle;
determining a lane change of the vehicle subsequent to moving the rear view camera to the second rear camera angle; and automatically moving the rear view camera back to the first rear camera angle in response to the determining of the lane change.

7. The information handling system of claim 6 wherein the first rear camera angle corresponds to a default camera angle and the second rear camera angle corresponds to the selected region.

8. The information handling system of claim 7 wherein the actions performed further comprise:
providing an indication to the vehicle operator on the rear view display that indicates the video feed corresponds to the second rear camera angle.

9. The information handling system of claim 6 wherein the rear view video feed captures a live viewing area that is external to the vehicle.

10. The information handling system of claim 6 wherein the rear view camera is included in a plurality of rear view cameras, wherein the actions performed further comprise:
selecting a different one of the plurality of rear view cameras that correspond to the selected region; and
providing a different rear view video feed to the vehicle operator that is generated by the selected different one of the plurality of rear view cameras.

11. A computer program product stored in a non-transitory computer readable storage medium, comprising computer program code that, when executed by an information handling system, causes the information handling system to perform actions comprising:
providing a rear view video feed from a rear view camera on a rear view display;
determining that an eye focus point of a vehicle operator is positioned in a selected one of a plurality of regions located on the rear view display for at least a predetermined amount of time, wherein each of the plurality of regions corresponds to one of a plurality of subsections of the rear view display; and
adjusting the rear view camera based upon the eye focus point from a first rear camera angle to a second rear camera angle;
determining a lane change of the vehicle subsequent to moving the rear view camera to the second rear camera angle; and
automatically moving the rear view camera back to the first rear camera angle in response to the determining of the lane change.

12. The computer program product of claim 11 wherein the first rear camera angle corresponds to a default camera angle and the second rear camera angle corresponds to the selected region.

13. The computer program product of claim 12 wherein the actions further comprise:
providing an indication to the vehicle operator on the rear view display that indicates the video feed corresponds to the second rear camera angle.

14. The computer program product of claim 11 wherein the rear view camera is included in a plurality of rear view cameras, wherein the actions further comprise:
selecting a different one of the plurality of rear view cameras that correspond to the selected region; and
providing a different rear view video feed to the vehicle operator that is generated by the selected different one of the plurality of rear view cameras.

* * * * *